United States Patent
Fujiwara et al.

(10) Patent No.: US 9,003,598 B2
(45) Date of Patent: Apr. 14, 2015

(54) WIPER BLADE AND VEHICLE WIPER DEVICE

(75) Inventors: Masaru Fujiwara, Kiryu (JP); Kenichi Imoto, Kiryu (JP); Tsukasa Ogino, Kiryu (JP)

(73) Assignee: Mitsuba Corporation, Kiryu-shi, Gunma (JP)

(*) Notice: Subject to any disclaimer, the term of this patent is extended or adjusted under 35 U.S.C. 154(b) by 966 days.

(21) Appl. No.: 13/061,739

(22) PCT Filed: Sep. 1, 2009

(86) PCT No.: PCT/JP2009/065265
§ 371 (c)(1),
(2), (4) Date: Mar. 2, 2011

(87) PCT Pub. No.: WO2010/026967
PCT Pub. Date: Mar. 11, 2010

(65) Prior Publication Data
US 2011/0162162 A1  Jul. 7, 2011

(30) Foreign Application Priority Data

Sep. 4, 2008  (JP) ................................. 2008-227385
Sep. 4, 2008  (JP) ................................. 2008-227485
Dec. 16, 2008 (JP) ................................. 2008-319317

(51) Int. Cl.
*B60S 1/38*  (2006.01)

(52) U.S. Cl.
CPC .............. *B60S 1/3808* (2013.01); *B60S 1/3801* (2013.01); *B60S 1/381* (2013.01); *B60S 1/3863* (2013.01); *B60S 2001/3836* (2013.01)

(58) Field of Classification Search
USPC .......................... 15/250.43, 250.44, 250.361, 15/250.451–250.454, 250.201
See application file for complete search history.

(56) References Cited

U.S. PATENT DOCUMENTS

| 6,038,728 A  | 3/2000 | Terai et al. |
| 6,739,018 B1 | 5/2004 | Jallet et al. |

(Continued)

FOREIGN PATENT DOCUMENTS

| CN | 1386097 A | 12/2002 |
| CN | 1647980 A | 8/2005 |

(Continued)

OTHER PUBLICATIONS

The International Search Report from corresponding International Application No. PCT/JP2009/065265 dated Sep. 25, 2009.

(Continued)

*Primary Examiner* — Gary Graham
(74) *Attorney, Agent, or Firm* — McCormick, Paulding & Huber LLP

(57) ABSTRACT

An interval between an inner face 31c1 of a back wall 31c in a rubber holder 31 and a blade rubber 32 is formed so as to become gradually expanded with respect to an interval between an inner face 31b1 of a front wall 31b and the blade rubber 32 as being directed toward a center portion from both longitudinal-directional end portions of the rubber holder 31. Also, an interval between an inner face of each back wall in a pair of covers coupled to the both longitudinal-directional end portions of the rubber holder 31 and the blade rubber is formed so as to become gradually expanded with respect to an interval between the inner face of the front wall and the blade rubber as being directed toward the center portion from both longitudinal-directional end portions of the cover. Accordingly, a flow of travel wind during a travel of a vehicle is facilitated between the rubber holder 31 and the blade rubber 32 or between the covers and the blade rubber 32.

4 Claims, 13 Drawing Sheets

(56) References Cited

U.S. PATENT DOCUMENTS

| | | | |
|---|---|---|---|
| 7,137,167 B2 * | 11/2006 | Torii et al. | 15/250.201 |
| 2003/0028990 A1 | 2/2003 | Zimmer | |
| 2005/0166349 A1 | 8/2005 | Nakano et al. | |
| 2006/0064841 A1 * | 3/2006 | Nakano | 15/250.201 |

FOREIGN PATENT DOCUMENTS

| | | |
|---|---|---|
| JP | 63-166861 | 10/1988 |
| JP | 11-43020 A | 2/1999 |
| JP | 2002-528324 T | 9/2002 |
| JP | 2004-504985 T | 2/2004 |
| JP | 2006-232078 A | 9/2006 |
| JP | 2006-290220 A | 10/2006 |
| JP | 2006-327589 A | 12/2006 |
| JP | 2008-49785 A | 3/2008 |
| JP | 2008-114746 A | 5/2008 |

OTHER PUBLICATIONS

Office Action and English Translation received in Chinese Patent Application Serial No. 200980130674.0 dated Jun. 24, 2013.
Office Action for Chinese Serial No. 200980130674.0 dated Dec. 4, 2012.

* cited by examiner

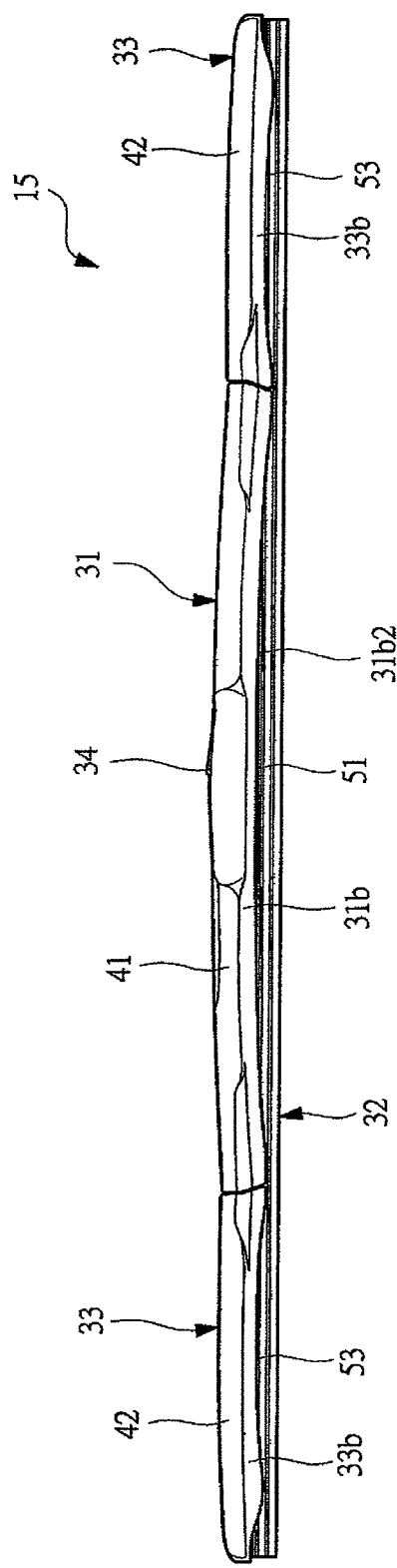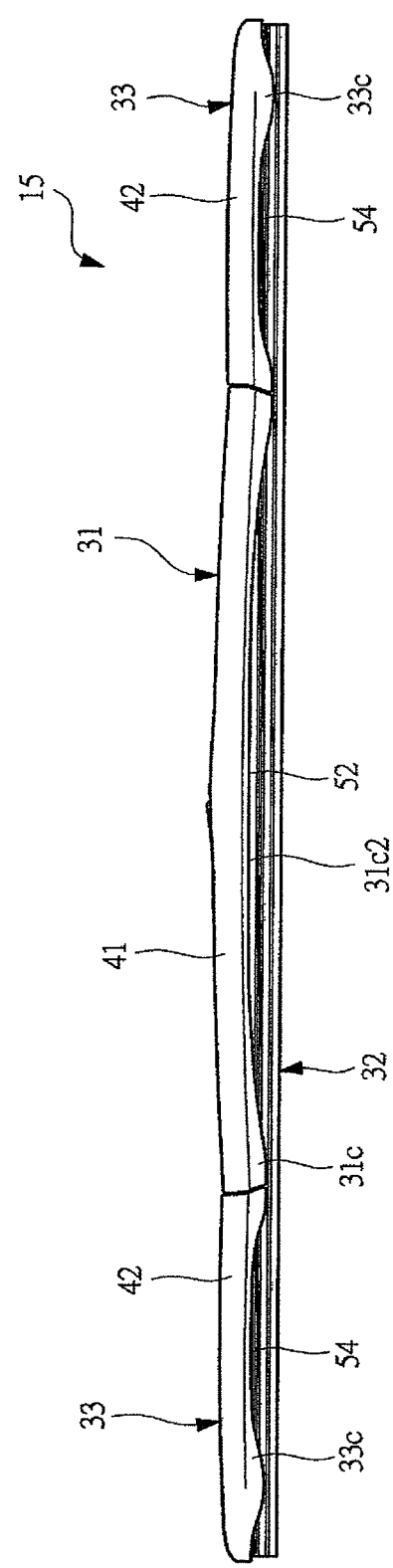

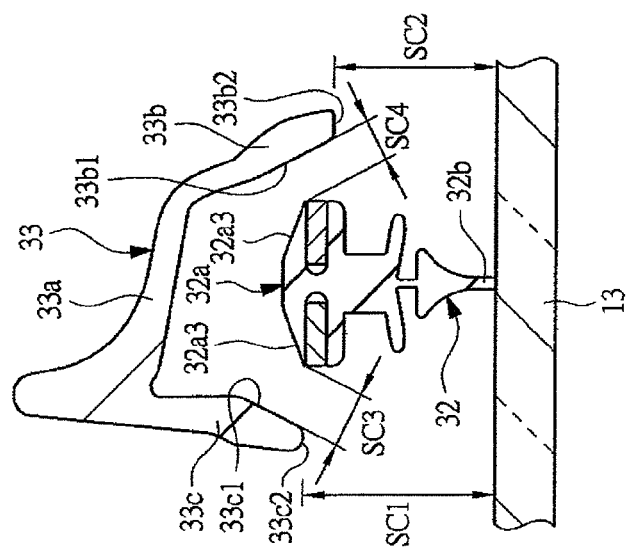
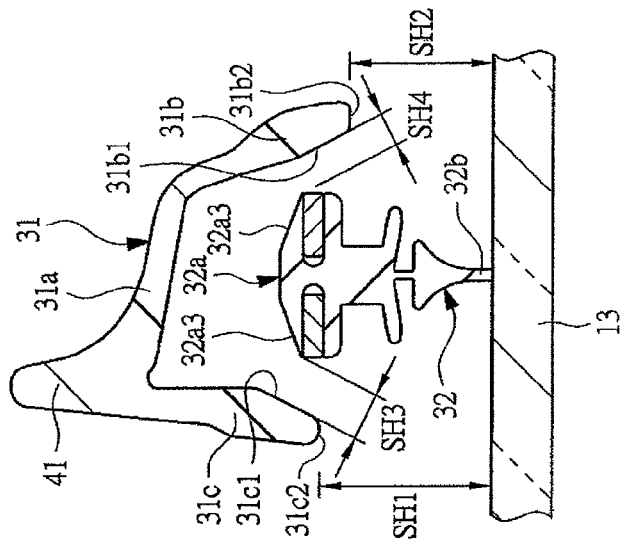
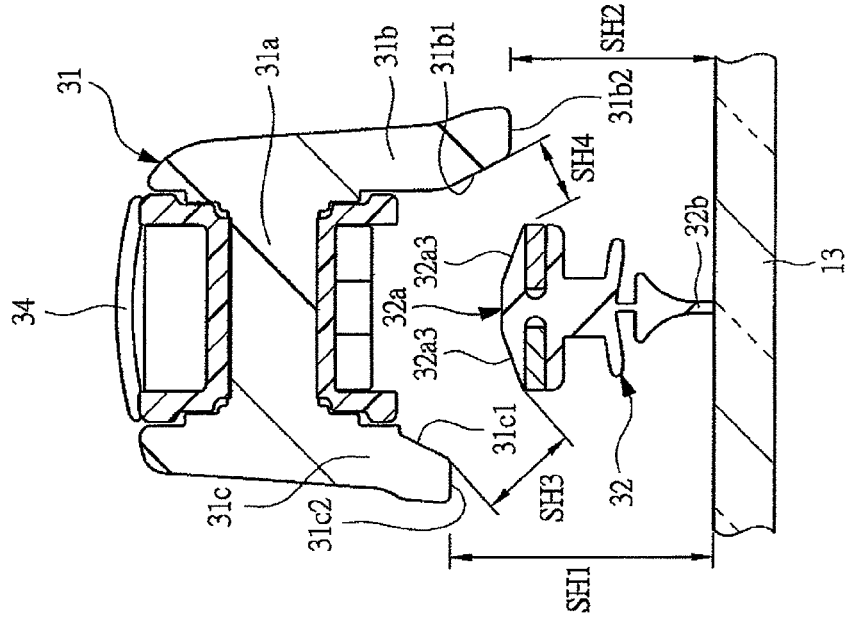

WIPER BLADE AND VEHICLE WIPER DEVICE

CROSS REFERENCE TO RELATED APPLICATIONS

This application is entitled to the benefit of and incorporates by reference essential subject matter disclosed in International Patent Application No. PCT/JP2009/065265 filed on Sep. 1, 2009 and Japanese Patent Application Nos. 2008-227385 filed Sep. 4, 2008; 2008-227485 filed Sep. 4, 2008; and 2008-319317 filed Dec. 16, 2008.

TECHNICAL FIELD

The present invention relates to a wiper blade, which is attached to a tip of wiper arm to wipe a window glass of a vehicle, and relates to a vehicle wiper device.

BACKGROUND ART

A vehicle such as an automobile is provided with a wiper device to wipe attachments such as rainwater adhering to a window glass (windshield glass). This wiper device has a wiper arm swingably supported at the vehicle, and a wiper blade is attached to a tip of the wiper blade.

The wiper blade includes a rubber holder with holding claws at both longitudinal-directional end portions, and a blade rubber engaged with the holding claws and held by the rubber holder, and contacts with the window glass at a portion of the blade rubber. Also, covers are coupled to the both longitudinal-directional end portions of the rubber holder, and portions on tip sides of the blade rubber that protrudes from the rubber holder are covered with those covers. Further, upon a state of contacting the blade rubber with the window glass, the wiper arm is driven for swing within a range of a predetermined angle, whereby the wiper blade is swung on the window glass so that a glass face is wiped.

This wiper blade is subjected to travel wind during a travel of the vehicle. Therefore, when the vehicle runs at high speed, a lift force or drag to which the vehicle is subjected from the travel wind is increased, and its wiping characteristic often deteriorates.

For this reason, in a wiper blade shown in, for example, Japanese Patent Application Laid Open Publication No. 2006-232078, a fin-shaped cover member is attached to the rubber holder, and this cover member is subjected to or receives travel wind. Therefore, a pressing force directed to window glass, i.e., a down force is generated at a wiper blade, whereby a wiping characteristic of the wiper blade during a travel of the vehicle is intended to be enhanced.

SUMMARY OF THE INVENTION

However, in the wiper blade shown in Japanese Patent Application Laid Open Publication No. 2006-232078, the travel wind, which flows on an upper side of the wiper blade along the cover member, generates an eddy or eddies on a back-face side of the wiper blade, and a negative pressure is caused on the back-face side of the wiper blade by the eddy. Therefore, the wiper blade, which inversely operates at an upper inversion position, causes a water-conducting phenomenon in which rainwater etc. swept from outside a wiping range is drawn again into the wiping range by the negative pressure, and its wiping characteristic has deteriorated in some cases.

An object of the present invention is to suppress a water-conducting phenomenon after an inversed operation to enhance a wiping characteristic of a wiper blade during a travel of a vehicle.

A wiper blade according to the present invention is a wiper blade attached to a tip of a wiper arm to wipe a window glass of a vehicle, the wiper blade comprising: a rubber holder having holding claws on both longitudinal-directional end portions, and attached to the wiper arm at a longitudinal-directional center portion; and a blade rubber engaged with the holding claws and held by the rubber holder, a longitudinal-directional intermediate portion of the blade rubber being covered with the rubber holder, and contacting with the window glass, wherein the rubber holder has a top wall, a front wall disposed on a vehicle-front side with respect to the top wall, and a back wall disposed on a vehicle-back side with respect to the top wall, and wherein an interval between an inner face of the back wall and the blade rubber becomes gradually expanded with respect to an interval between an inner face of the front wall and the blade rubber as being directed toward the center portion from the both longitudinal-directional end portions of the rubber holder.

The wiper blade according to the present invention is such that an interval between a lower end of the back wall and the window glass becomes gradually large with respect to an interval between a lower end of the front wall and the window glass as being directed toward the center portion from the both longitudinal-directional end portions of the rubber holder.

A wiper blade according to the present invention is a wiper blade attached to a tip of a wiper arm to wipe a window glass of a vehicle, the wiper blade comprising: a rubber holder having holding claws on both longitudinal-direction end portions, and attached to the wiper arm at a longitudinal-directional center portion; a blade rubber engaged with the holding claws and held by the rubber holder, a longitudinal-directional intermediate portion of the blade rubber being covered with the rubber holder, and contacting with the window glass; and a pair of covers coupled respectively to the both longitudinal-directional end portions of the rubber holder, and covering a portion on a tip side of the blade rubber protruding from the rubber holder, wherein each of the rubber holder and the covers has a top wall, a front wall disposed on a vehicle-front side with respect to the top wall, and a back wall disposed on a vehicle-back side with respect to the top wall, and wherein an interval between an inner face of the back wall and the blade rubber becomes gradually expanded with respect an interval between an inner face of the front wall and the blade rubber as being directed toward a center portion from both longitudinal-directional end portions of the rubber holder or covers.

The wiper blade according to the present invention is such that an interval between a lower end of the back wall and the window glass becomes gradually large with respect to an interval between a lower end of the front wall and the window glass as being directed toward the center portion from the both longitudinal-directional end portions of the rubber holder or covers.

A vehicle wiper device according to the present invention comprises: a wiper blade including a blade rubber slid on a wiping face, and a cover member holding the blade rubber and covered with the blade rubber; and a wiper arm, whose tip portion is attached to a longitudinal-directional center portion of the wiper blade and which is swingably mounted on a vehicle, wherein the cover member has: a front wall portion provided on a vehicle-front side of the blade rubber; a back wall portion provided on a vehicle-back side of the blade rubber; a ceiling wall portion connecting the front and back wall portions, and having a fin, which is subjected to travel wind to bias the wiper blade onto a side of the wiping face; an opening portion opened on the wiping face side; and a through hole formed in the ceiling wall portion, and guiding a part of the travel wind onto a vehicle-back side of the wiper blade via the opening portion.

The vehicle wiper device according to the present invention is such that the formed through hole is at least one in number between the longitudinal-directional center portion of the wiper blade and one longitudinal-directional end portion of the wiper blade on a base end side of the wiper arm.

The vehicle wiper device according to the present invention is such that the back wall portion is formed, at least between the longitudinal-directional center portion of the wiper blade and the one longitudinal-directional end portion of the wiper blade on the base end side of the wiper arm, aslope in a direction of being separate from the blade rubber as being directed toward the wiping face side.

According to the present invention, a flow of travel wind is facilitated between the blade rubber and the rubber holder, and this travel wind can reduce an eddy generated by the travel wind flowing on an upper side of the rubber holder. Therefore, occurrence of a water-conducting phenomenon generated by a negative pressure of the eddy after an inversed operation is suppressed, and a wiping characteristic of the wiper blade during the travel of the vehicle can be enhanced.

Also, according to the present invention, in the wiper blade in which the covers are coupled to the both longitudinal-direction end portions of the rubber holder, the flow of the travel wind can be facilitated also between the blade rubber and the cover in addition to between the blade rubber and the rubber holder. Therefore, occurrence of a negative pressure due to the eddy over the entire longitudinal-directional range of the wiper blade is reduced, and the wiping characteristic of the wiper blade can be enhanced.

According to the present invention, since the through hole is formed in the ceiling wall portion of the cover member, and a part of the travel wind is aggressively guided onto a back-face side (vehicle-back side) of the wiper blade via the opening portion, the travel wind guided onto the back-face side of the wiper blade suppresses occurrence of the back-face-side negative pressure due to the travel wind flowing above along the fin. Accordingly, for example, at an upper inversion of the wiper blade, rainwater removed from outside a wiping area can be prevented from being drawn (water-conducting) inside the wiping area by the back-face-side negative pressure. Also, the travel wind entering and flowing in the cover member flows onto a back-face side of the wiper blade and, simultaneously, flows inside the cover member longitudinally along the inner face of the back wall portion. Therefore, the travel wind can be caused to flow out from the back-face side of the wiper blade uniformly over the longitudinal-directional entirety of the wiper blade, and the occurrence of the back-face-side negative pressure over the longitudinal-directional entirety of the wiper blade can be certainly prevented.

BRIEF DESCRIPTION OF THE DRAWINGS

FIG. 4A is an elevation view of the wiper blade shown in FIG. 2, and FIG. 4B is a back view of the wiper blade shown in FIG. 2;

FIG. 5A is a sectional view taken along line A-A in FIG. 1, FIG. 5B is a sectional view taken along line B-B in FIG. 1, and FIG. 5C is a sectional view taken along line C-C in FIG. 1;

BEST MODE FOR CARRYING OUT THE INVENTION

Hereinafter, embodiments of the present invention will be described in detail based on the accompanying drawings.

Figure 1:
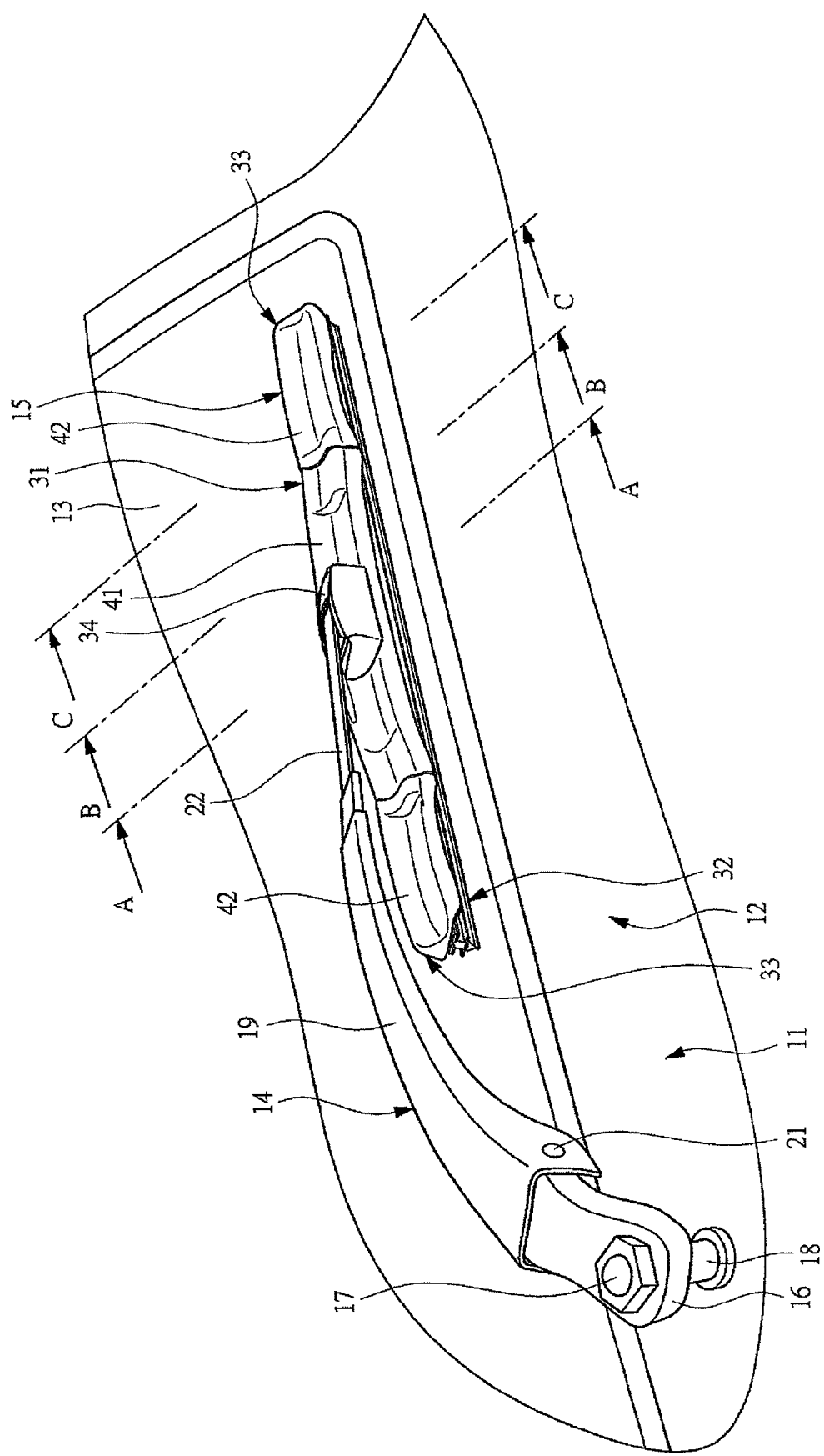
FIG. 1 is a perspective view showing a vehicle wiper device having a wiper blade according to an embodiment of the present invention.

FIG. 1 is a perspective view showing a vehicle wiper device having a wiper blade according to an embodiment of the present invention, and this vehicle wiper device 11 (hereinafter, abbreviated as "wiper device 11") is provided to a vehicle 12 such as an automobile to wipe a window glass (windshield glass) 13, and includes a wiper arm 14 and a wiper blade 15 attached to a tip of the wiper arm 14.

The wiper arm 14 has an arm head 16 made of aluminum die casting, and a base end of the arm head 16 is fixed to a pivot shaft (wiper shaft) 18 swingably provided to the vehicle 12 by a nut 17. The pivot shaft 18 is coupled to an unshown wiper motor equipped with the vehicle 12 via a link mechanism (not shown), and is driven by the wiper motor to swing within a predetermined angle range.

A retainer 19, which is made of steel plate and is formed into an arm shape having a substantially C-like cross section, is coupled by a connecting shaft 21 to a tip of the arm head 16 so as to be rotatable in directions of separating from or approaching the window glass 13. An arm stay 22 is fixed to a tip of the retainer 19 by caulking. Received inside the retainer 19 is an unshown spring for biasing the retainer 19 toward the window glass 13 using the connecting shaft 21 as a shaft center. By a biasing force of the spring, the wiper arm 14 applies a predetermined pressing force to the wiper blade 15.

Figure 2:
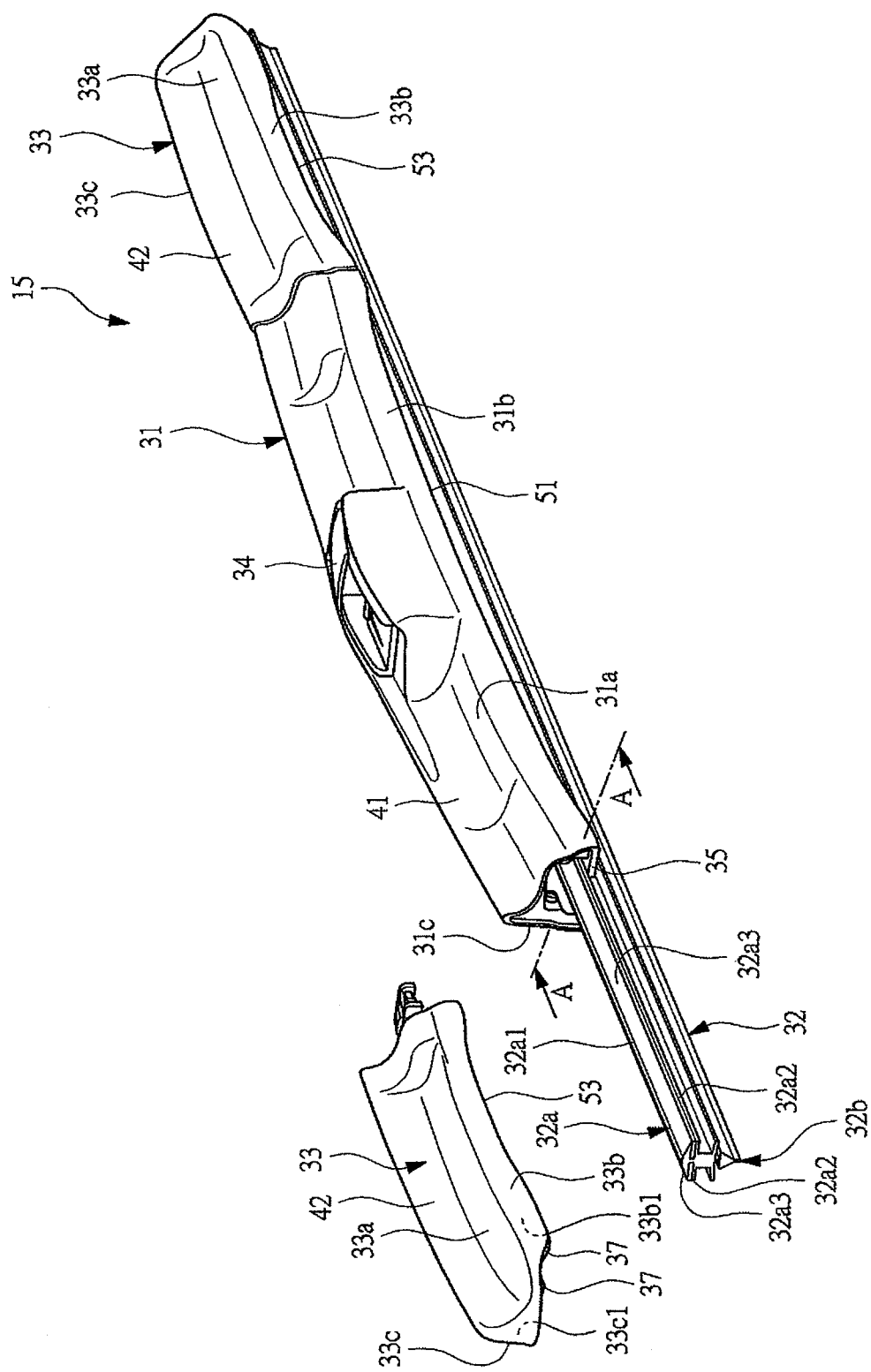
FIG. 2 is a perspective view showing a state of detaching one cover of the wiper blade shown in FIG. 1.
Figure 3:
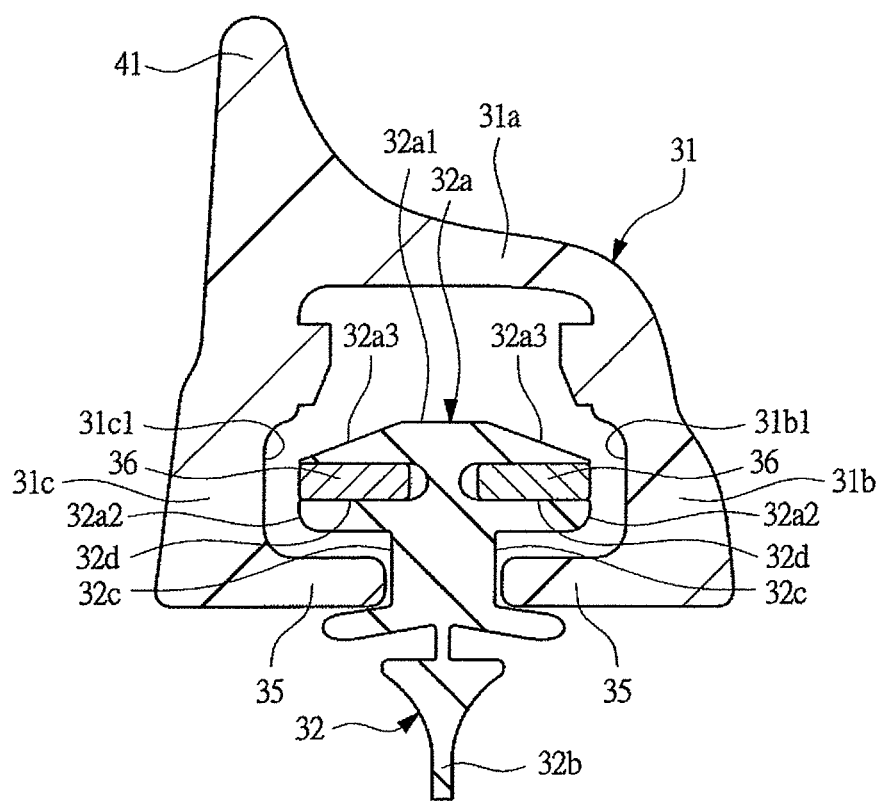
FIG. 3 is a sectional view taken along line A-A in FIG. 2.

FIG. 2 is a perspective view showing a state of detaching one cover of the wiper blade shown in FIG. 1, and FIG. 3 is a sectional view taken along line A-A in FIG. 2.

The wiper blade 15 has a rubber holder 31, a blade rubber 32, and a pair of covers 33, and is attached to the tip of the wiper arm 14 by a coupling portion 34 provided at a longitudinal-directional center portion of the rubber holder 31, thereby contacting with the window glass 13 at the blade rubber 32.

As shown in FIGS. 2 and 3, the rubber holder 31 has: a top wall 31a that faces in an opposite direction to the window glass 13 with respect t the blade rubber 32; a front wall 31a located on a vehicle-front side with respect to the top wall 31a when the wiper blade 15 is attached to the wiper arm 14 and is at a lower inversion position of the window glass 13; and a back wall 31c located on a vehicle-back side with respect to top wall 31a when the wiper blade 15 is at the lower inversion position. The rubber holder 31 is formed into a cover shape whose cross section is a substantially C shape, and whose length dimension is substantially half of the blade rubber 32. Also, both longitudinal-directional end portions of the rubber holder 31 are provided with a pair of holding claws 35 that protrude toward mutually opposite directions from an inner face 31b1 of the front wall 31b and an inner face 31c1 of the back wall 31c, respectively.

The blade rubber 32 is made of a rubber material, and is formed into a long stick shape, which includes a head portion 32a and a lip portion 32b and has longitudinally a uniform cross section. Provided between the head portion 32b and the lip portion 32b are holding grooves 32c, which open toward both wiping-directional side portions and extend along a longitudinally direction. When the holding grooves 32c are engaged with the holding claws 35 of the rubber holder 31, the blade rubber 32 is held by the rubber holder 31 at two positions, and a longitudinal-directional intermediate portion of the blade rubber is covered with the rubber holder 31.

Each of both side portions of the blade rubber 32 directed in the wiping direction of the head portion 32a is provided with a mounting groove 32d extending along the longitudinal direction, and vertebras (leaf springs) 36 are mounted in the mounting grooves 32. The vertebras 36 are each made of a material such as steel plate, formed so as to be deformable in directions of separating from and approaching the window glass 13, and bent with a predetermined curvature in a direction in which the both longitudinal-directional end portions are closer to the window glass 13 than a longitudinal-directional center portion. In a state where the blade rubber 32 does not contact with the window glass 13, the blade rubber 32 is bent with the vertebras 36.

The blade rubber 32 contacts with the window glass 32 at the lip portion 32b. When the blade rubber 32 contacts with the window glass 13, and a pressing force from the wiper arm 13 is applied to the wiper blade 15, each of the vertebras 36 is elastically deformed along a contour of the window glass 13, and the blade rubber 32 contacts with the window glass 13 with a predetermined distributed pressure in a state where the pressing force from the wiper arm 14 is exerted uniformly over the longitudinal-directional entirety by the elastic deformation of the vertebras 36.

As shown in FIG. 2, covers 33 forming a pair are each formed, similarly to the rubber holder 31, into a substantially C-like cross section that includes: a top wall 33a, which faces in an opposite direction to the window glass 13 with respect to the blade rubber 32 and is disposed adjacently to the top wall 31a of the rubber holder 31; a front wall 33b located on a vehicle-front side with respect to the top wall 33a when the wiper blade 15 is at the lower inversion position; and a back wall 33c located on a vehicle-back side with respect to the top wall 33a when the wiper blade 15 is at the lower inversion position. The respective covers 33 are coupled to the both longitudinal-directional end portions of the rubber holder 31, and covers tip-side portions of the blade rubber 32 longitudinally protruding from the rubber holder 31. Note that each tip portion of the covers 33 is provided with a pair of cover-securing claws 37 which protrude toward mutually opposite directions from an inner face 33b1 of the front wall 33b and an inner face 33c1 of the back wall 33c, respectively.

To improve an aerodynamic characteristic of the wiper blade 15 during the travel of the vehicle 12, and to prevent the wiper blade 15 from floating from the window glass 13, the rubber holder 31 is provided with a holder-side fin 41, and the respective covers 33 are provide with cover-side fins 42.

The holder-side fin 41 provided on the rubber holder 31 is formed, over the longitudinal-directional entirety, on the top wall 31a of the rubber holder 31 and at a portion that neighbors the back wall 31c and in which the coupling portion 34 is sandwiched. The cover-side fins 42 provided on the covers 33 are formed, over the longitudinal-directional entirety, on the top walls 33a of the covers 33 and at portions neighboring the back walls 33c. The fins 41 and 42 are inclined from the front walls 31b and 33b toward the back walls 31c and 33c and in directions of gradually separating from the top walls 31a and 33a, respectively, thereby generating at the wiper blade 15 a pressing force, i.e., a down force that lifts up the travel wind flowing above the wiper blade 15 during the travel of the vehicle 12 and is directed toward the window glass 13. Therefore, the wiping characteristic of the wiper blade 15 during the travel of the vehicle 12 is enhanced.

FIG. 4A is an elevation view of the wiper blade shown in FIG. 2, and FIG. 4B is a back view of the wiper blade shown in FIG. 2.

In the wiper blade 15, the front wall 31b and the back wall 31c of the rubber holder 31 are provided with holder-side notch portions 51 and 52, respectively. For this reason, it becomes easy to cause the travel wind during the travel of vehicle 12 to pass between the rubber holder 31 and the blade rubber 32, and the travel wind passing on an upper side of (above) the wiper blade 15 reduces an eddy generated on a back-face side of the back wall 31c, and the wiping characteristic of the wiper blade 15 is enhanced.

As shown in FIG. 4A, the holder-side notch portion 51 provided in the front wall 31b of the rubber holder 31 is formed into a shape in which a portion between the both longitudinal-directional end portions of the front wall 31b, i.e., a portion between the holding claws 35 provided to the both longitudinal-directional end portions is cut out from its lower end side (end on an opposite side to the window glass 13) toward a top wall 31a side. Its opening shape is formed so as to be gradually separate with respect to the window glass 13 as a lower end 31b2 of the front wall 31b is directed to a center portion from the both longitudinal-directional end portions of the rubber holder 31.

Meanwhile, as shown in FIG. 4B, the holder-side notch portion 52 provided in the back wall 31c of the rubber holder 31 is formed into a shape in which a portion between the both longitudinal-directional end portions of the back wall 31c, i.e., a portion between the holding claws 35 provided to the both longitudinal-directional end portions is cut out from its lower end (end on an opposite side to the window glass) toward a top wall 31a side. Its opening shape is formed so as to be gradually separate with respect to the window glass 13 as a lower end 31c2 of the back wall 31c is directed to a center portion from the both longitudinal-directional end portions.

Similarly, in the wiper blade 15, the front wall 33b and the back wall 33c of each cover 33 coupled to the both longitudinal-directional end portions of the rubber holder 31 are provided with cover-side notch portions 53 and 54, respectively. For this reason, it becomes easy to cause the travel wind during the travel of the vehicle 12 to pass between the covers 33 and the blade rubber 32, and the travel wind passing on an upper side of (above) the wiper blade 15 reduces an eddy generated on a back-face side of the back wall 33c, and the wiping characteristic of the wiper blade 15 is enhanced.

As shown in FIG. 4A, the cover-side notch portions 53 provided in the front walls 33b of the covers 33 are each formed into a shape in which a portion between the both longitudinal-directional end portions of the front wall 33b is cut out from its lower end side (end on an opposite side to the window glass 13) toward a top wall 33a side. Their opening shapes are each formed so as to be gradually separate with respect to the window glass 13 as a lower end 33b2 of the front wall 33b is directed toward a center portion from the both longitudinal-directional end portions of the cover 33.

Meanwhile, as shown in FIG. 4B, the cover-side notch portions 54 provided in the back walls 33c of the covers 33 are each formed into a shape in which the both longitudinal-directional end portions of the back wall 33c is cut out from its lower end side (end on an opposite side to the window glass) toward a top wall 33a side. Their opening shapes are each formed so as to be gradually separate with respect to the window glass 13 as a lower end 33c2 of the back wall 33c is directed toward a center portion from the both longitudinal-directional end portions of the cover 33.

FIG. 5A is a sectional view taken along line A-A in FIG. 1; FIG. 5B is a sectional view taken along line B-B in FIG. 1; and FIG. 5C is a sectional view taken along line C-C in FIG. 1.

In the wiper blade 15, as shown in FIGS. 5A and 5B, a distance "SH1" between the lower end 31c2 of the back wall 31c in the rubber holder 31 and the window glass 13 is formed so as to become gradually large with respect to a distance "SH2" between the lower end 31b2 of the front wall 31b and the window glass 13 as being directed toward the center portion from the both longitudinal-directional end portions of the rubber holder 31. By doing so, a distance "SH3" between the inner face 31c1 of the back wall 31c and the blade rubber 32 becomes gradually expanded with respect to a distance "SH4" between the inner face 31b1 of the front wall 31b and the blade rubber 32 as being directed toward the center portion form the both longitudinal-directional end portions of the rubber holder 31. Also, the front wall 31b and the back wall 31c of the rubber holder 31 are provided with the holder-side notch portions 51 and 52, respectively, whereby the lower end 31b2 of the front wall 31b is set to substantially the same height as that of head portion 31a of the blade rubber 32 at the substantially center portion in the longitudinal direction, and the lower end 31c2 of the back wall 31c is set above the head portion 32a of the blade rubber 32 (in a direction of being separate from the window glass 13). Therefore, the travel wind, which enters between the rubber holder 32 and the blade rubber 32 from the front wall 31b side during the travel of the vehicle 12, passes between the rubber holder 31 and the blade rubber 32 and can be efficiently caused to flow on the back side of the wiper blade 15.

Similarly, in this wiper blade 15, as shown in FIG. 5C, a distance "SC1" between the lower end 33c2 of the back wall 33c in the cover 33 and the window glass 13 is formed so as to become gradually large with respect to a distance "SC2" between the lower end 33b2 of the front wall 33b and the window glass 13 as being directed toward the center portion from the both longitudinal-directional end portions of the cover 33. By doing so, a distance "SC3" between the inner face 33c1 of the back wall 33c and the blade rubber 32 becomes gradually expanded with respect to a distance "SC4" between the inner face 33b1 of the front wall 33b and the blade rubber 32 as being directed toward the center portion from the both longitudinal-directional portions of the cover 33. Also, the front wall 33b and the back wall 33c of the cover 33 are provided with the cover-side notch portions 53 and 54, respectively, whereby each of the lower end 33b2 of the front wall 32b and the lower end 31c2 of the back wall 31c is set to substantially the same height as that of the head portion 32a of the blade rubber 21 at the substantially center portion in the longitudinal direction. Therefore, the travel wind, which enters between the cover 33 and the blade rubber 32 from the front wall 33b side during the travel of the vehicle 12, passes between the cover 33 and the blade rubber 32 and can be efficiently caused to flow on the back side of the wiper blade 15.

Also, in this wiper blade 15, as shown in FIG. 3, by chamfering the head portion 32a between a face directed on an opposite side to the window glass 13, i.e., a ceiling face 32a1, and both side faces 32a2 directed in the wiping direction, the head portion 32a of the blade rubber 32 is provided with a pair of inclined faces 32a3 over the entire longitudinal-directional range for arranging continuously the above-mentioned faces. Those inclined faces 32a3 are each inclined in a direction of being gradually separate from the lip portion 32b, i.e., the window glass 13 as being directed toward the ceiling face 32a1 from each of the side faces 32a2, whereby the head portion 32a of the blade rubber 32 is formed into such a shape that the center portion in the wiping direction protrudes on an opposite side to the lip portion 32b.

Thus, the both side faces 32a2 sides of the head portion 32a in the blade rubber 32 are chamfered and formed into a convex shape having the pair of inclined faces 32a3. Therefore, the distances SH3, SH4, SC3, and SC4 between the blade rubber 32 and the inner faces 31b1, 31c1, 33b1, and 33c1 of the front walls 31b and 33b or back walls 31c and 33c of the cover 33 or the rubber holder 31 are set large, and the travel wind can be caused to flow easily between the rubber holder 31 and the blade rubber 32 or/and between the cover 33 and the blade rubber 32.

Figure 6:
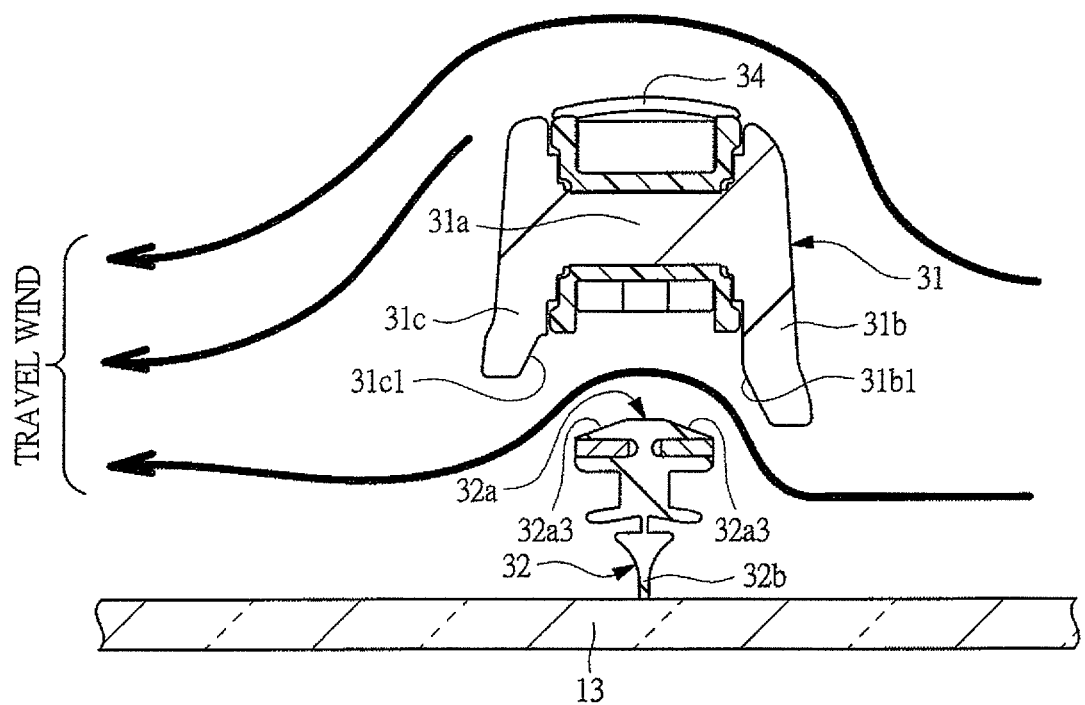
FIG. 6 is a sectional view showing a state where the wiper blade shown in FIG. 1 is subjected to travel wind during a travel of a vehicle.

FIG. 6 is a sectional view showing a state of travel wind to which the wiper blade shown in FIG. 1 is subjected during the travel of the vehicle.

By such a structure, in this wiper blade 15, the travel wind can be caused to flow easily between the rubber holder 31 and the blade rubber 32 during the travel of the vehicle 12 and, particularly, providing the coupling portion 34 can cause the travel wind to flow easily in the longitudinal-directional center portion of the rubber holder 31 where the eddy is generated easily.

Therefore, as shown in FIG. 6, the travel wind flowing in a back-face side of the back wall 31c via an upper side of the rubber holder 31 flows in the vehicle-back side along with the travel wind passing and flowing between the rubber holder 31 and the blade rubber 32 under the rubber holder 31, and the travel wind flowing in the upper side of the rubber holder 31 can suppress generation of the eddy on the back-face side of the back wall 31c.

Further, similarly to an instance of the rubber holder 31, also by each of the covers 33, the travel wind flowing on the back face side of the back wall 33c via the upper side of the cover 33 is caused to flow on the vehicle-back side along with the travel wind flowing between the cover 33 and the blade rubber 32, whereby generation of the eddy on the back-face side of the back wall 33c due to the travel wind can be suppressed.

Thus, in this wiper blade 15, since the flow of the travel wind can be facilitated between the rubber holder 31 and the blade rubber 32, the eddy generated by the travel wind flowing on the upper side of the rubber holder 31 can be reduced by the above-mentioned travel wind. Further, since the flow of the travel wind can be facilitated also between the pair of covers 33 and the blade rubber 32 in addition to between the rubber holder 31 and the blade rubber 32, the eddy generated by the travel wind flowing on the upper side of the cover 33 can be reduced by the above-mentioned travel wind. Namely, the generation of the eddy, i.e., the negative pressure on a downstream side, i.e., the back-face side of the wiper blade 15 can be suppressed over the entire longitudinal-directional range of the wiper blade 15. Accordingly, a water-conducting phenomenon generated by the wiper blade 15 after an inversed operation of the wiper blade 15 can be suppressed, and the wiping characteristic of the wiper blade 15 during the travel of the vehicle 12 can be enhanced.

Figure 7A:
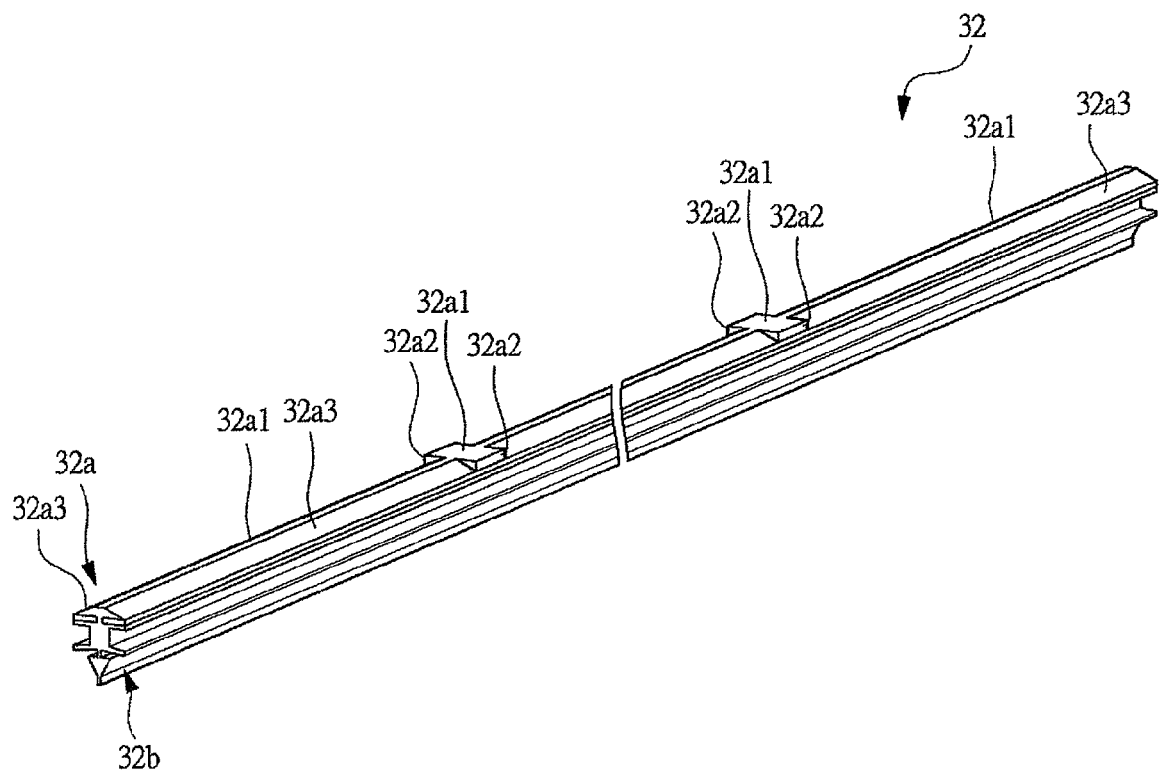
FIG. 7A and FIG. 7B are each a perspective view showing a modification of a blade rubber shown in FIG. 2.
Figure 7B:
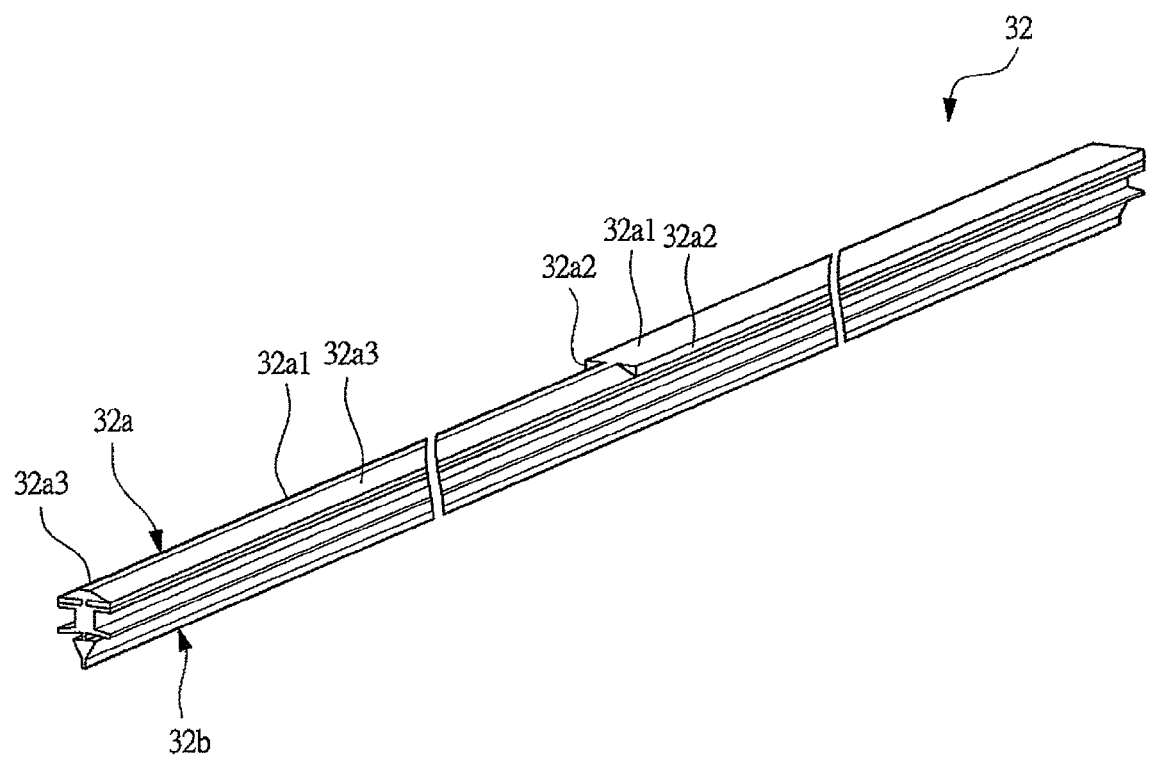

Each of FIGS. 7A and 7B is a perspective view of a modification of the blade rubber shown in FIG. 2.

In an instance shown in FIG. 2, the head portion 32a of the blade rubber 32 is provided with a pair of inclined faces 32a3 that arrange continuously a ceiling face 32a1 and both side faces 32a2 over its entire longitudinal-direction range, but the present embodiment is not limited to this, and may be, as shown in FIG. 7A, such that portions (two positions) engaged with the holding claws 35 of the rubber holder 31 in the blade rubber 32 are formed into rectangular shapes in which the inclined faces 32a3 are not formed. By doing so, the blade rubber 32 is certainly held to the rubber holder 31 by the holding claws 35 provided to the rubber holder 31 and, simultaneously, the flow of the travel wind can be facilitated between the blade rubber 31 and the rubber holder 32.

Further, as shown in FIG. 7B, the pair of inclined faces 32a3 may be formed only within a range from a longitudinal-directional intermediate position of the blade rubber 32 to a tip portion located on a side neighboring the pivot shaft 18. By doing so, since they overlap with the wiper arm 14, the wiping characteristic of the wiper blade 15 can be enhanced within a range from the coupling portion 34, in which improved effects of the wiping characteristics due to the fins 41 and 42 are small, to the tip portion located on the side neighboring the pivot shaft 18.

Figure 8:
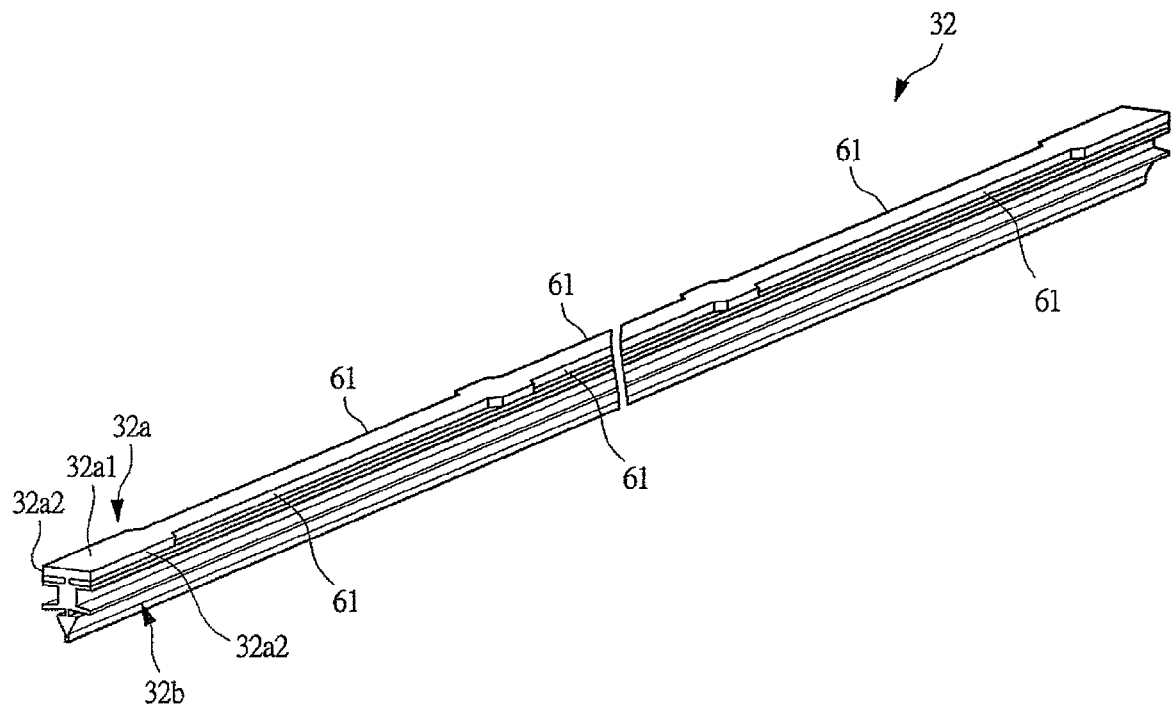
FIG. 8 is a modification of the blade rubber shown in FIG. 2.
Figure 9:
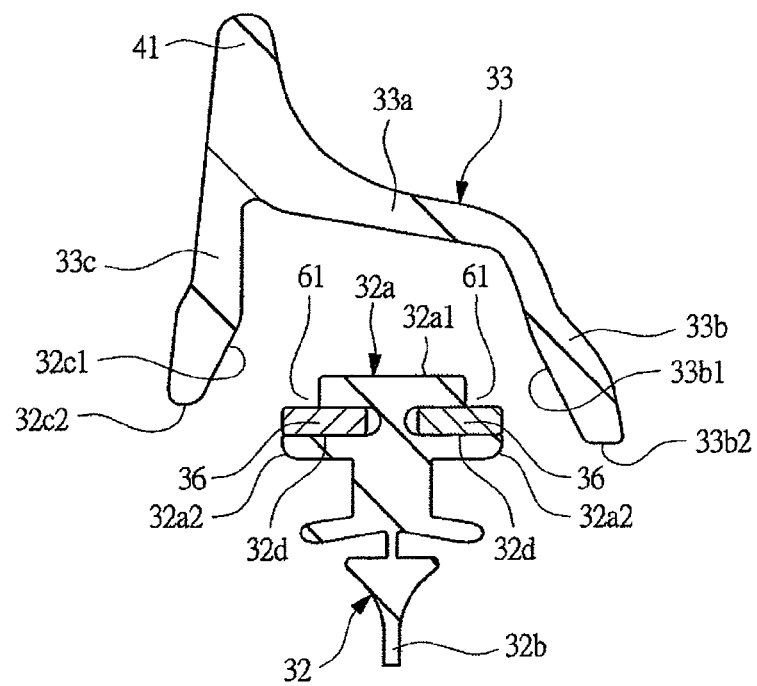
FIG. 9 is a sectional view of a cover portion of the wiper blade having a blade rubber shown in FIG. 8.

FIG. 8 is a modification of the blade rubber shown in FIG. 2, and FIG. 9 is a sectional view of a cover portion of a wiper blade having a blade rubber shown in FIG. 8.

In the blade rubber 32 shown in FIG. 2, as its detail is shown in FIG. 3, the head portion 32a of the blade rubber 32 is provided with the pair of inclined faces 32a3, whereby the distances of the rubber holder 31 and/or of the front walls 31b and 33b and the back walls 31c and 33c in the covers 33 with respect to the inner faces 31b1, 31c1, 33b1, and 33c1 and/or to the blade rubber 32 are expanded, and the flow of the travel wind is facilitated between the rubber holder 31 and the blade rubber 32 or between the covers 33 and the blade rubber 32.

In contrast, in the blade rubber shown in FIGS. 8 and 9, notches 61, instead of the inclined faces 32a3, are provided at both corner portions formed by the ceiling wall 32a1 and the both side faces 32a2 of the head portion 32a in the blade rubber 32, respectively, whereby the distances of the rubber holder 31 and/or the covers 33 with respect to the inner faces 31b1, 31c1, 33b1, and 33c1 are expanded by those notches 61. Each of the notches 61 is formed so as to arrive at the mounding groove 32d, in which the vertebra 36 is mounted, from the ceiling face 32a of the head portion 32, and causes an outer half of the vertebra 36 to be exposed. Also, as shown in FIG. 8, the notches 61 are formed so as to extend longitudinally at portions, which exclude a predetermined range from the both tip portions of the blade rubber 32 and exclude the portions (two portions) engaged with the holding claws 35 of the rubber holder 31.

Therefore, similarly to the blade rubber 32 shown in FIG. 2, the distances of the rubber holder 31 and/or the front walls 31b and 33b and the back walls 31c and 33c in the covers 33 with respect to the inner faces 31b1, 31c1, 33b1, and 33c1 are expanded, and the flow of the travel wind can be facilitated between the rubber holder 31 and blade rubber 32 and/or between the covers 33 and the blade rubber 32.

Note that, in an instance shown in FIG. 8, the notches 61 are formed only at the above predetermined portions of the blade rubber 32. However, the present embodiment is not limited to these, and the notches 61 may be formed in any range of the blade rubber 32.

Needless to say, the present invention is not limited to the above embodiment, and may be variously modified within a scope of not departing from the gist. For example, in the above embodiment, the wiper blade 15 has a structure in which the covers 33 are coupled to the both longitudinal-directional end portions of the rubber holder 31, but is not limited to this structure. The present invention may be applied to the wiper blade 15 having no pair of covers 33.

Also, in the above embodiment, the rubber holder 31 is provided with the holder-side fin 41, and the covers 33 are provided with the cover-side fins 42. However, the present invention is not limited to these, and may be applied to the rubber holder 31 and/or covers 33 on which the fins 41 and 42 are not provided.

Further, in the above embodiment, the pair of inclined faces 32a3 is formed at the head portions 32a of the blade rubber 32. However, the present invention is not limited to this, and may use the blade rubber 32 provided with the head portions 32a, which are formed into rectangular cross sections and do not have the inclined faces 32a3.

Next, a vehicle wiper device according to another embodiment of the present invention will be detailed based on the accompanying drawings.

Figure 10:
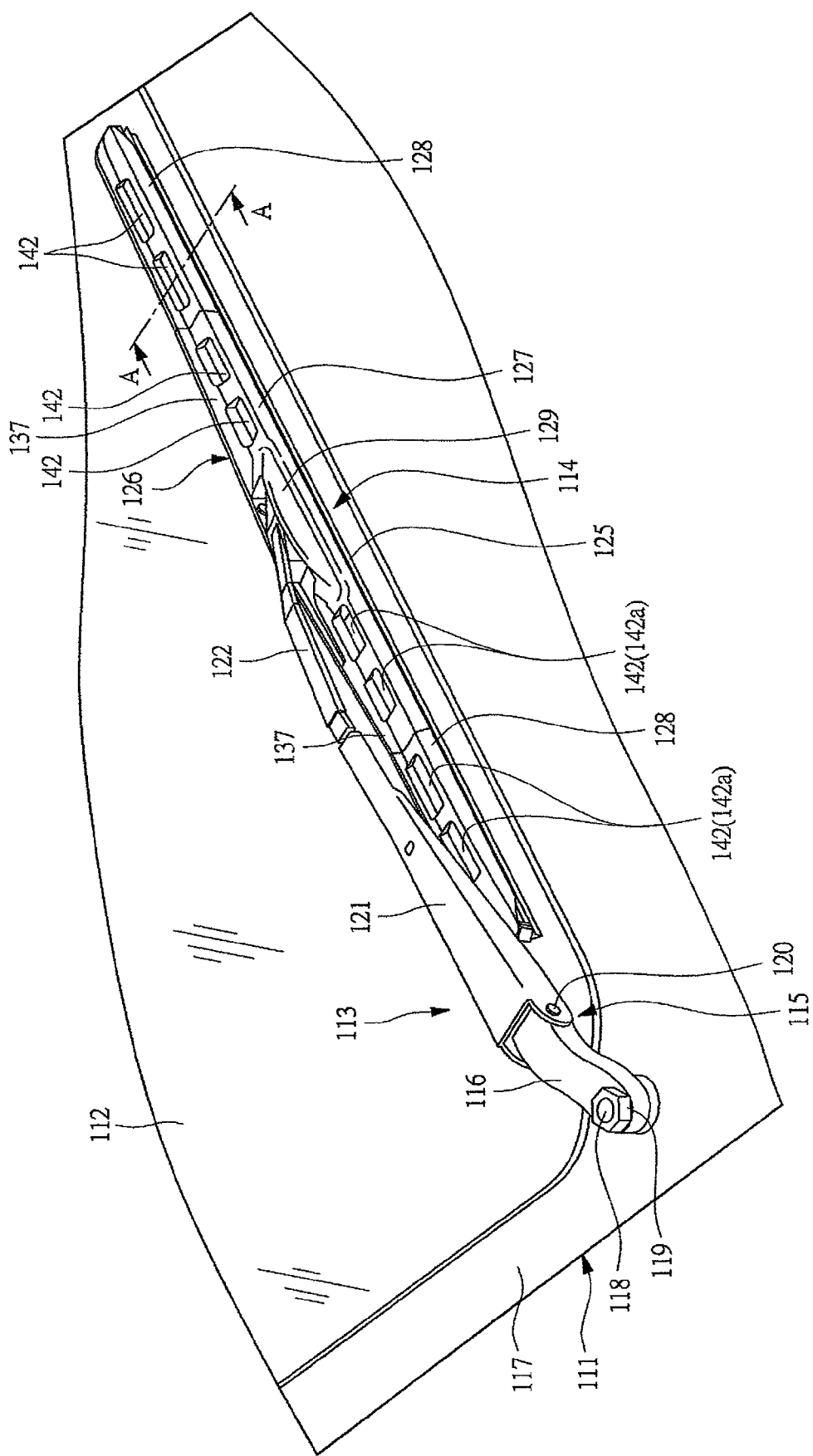
FIG. 10 is a perspective view showing a vehicle wiper device according to an embodiment of the present invention.
Figure 11:
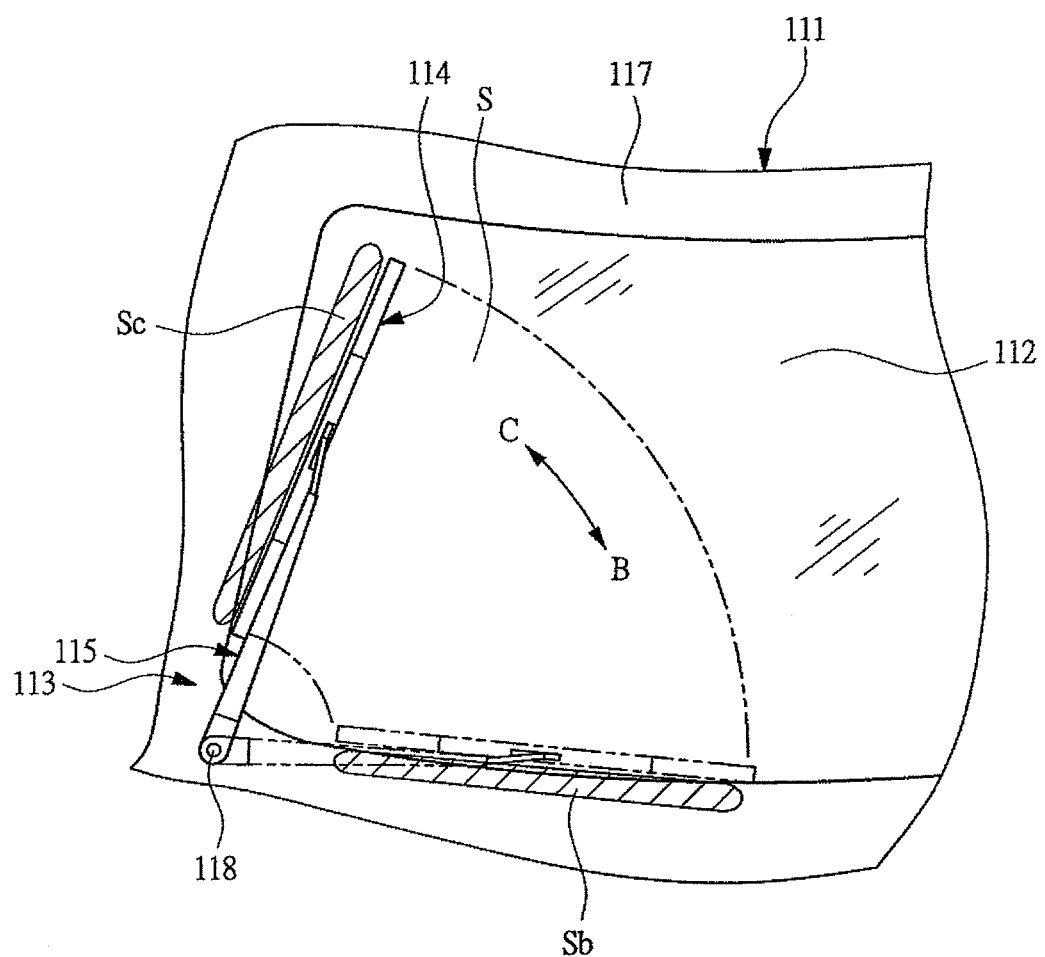
FIG. 11 is a schematic view showing an operation of the vehicle wiper device.
Figure 12:
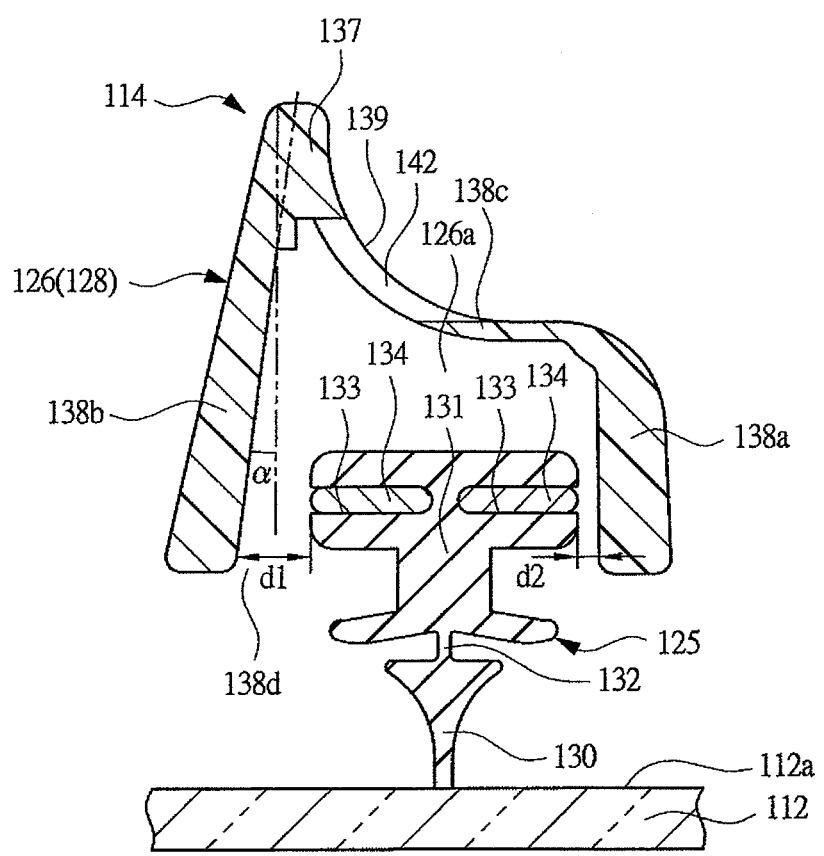
FIG. 12 is a sectional view taken along line A-A in FIG. 10.

FIG. 10 is a perspective view showing a vehicle wiper device according to an embodiment of the present invention; FIG. 11 is a schematic view showing an operation of the vehicle wiper device; and FIG. 12 is a sectional view taken along line A-A in FIG. 10.

A vehicle 111 such as automobile is provided with a vehicle wiper device 113 (hereinafter, abbreviated as "wiper device 13") for wiping attachments such as rainwater adhering to a window glass (windshield glass) 12. This wiper device 13 includes, as shown in FIG. 10, a wiper blade 114 that wipes the window glass 112, and a wiper arm 115 that swings the wiper blade 114 on the window glass 112.

The wiper arm 115 is provided with an arm head 116 made of aluminum die casting, and the wiper arm 115 is fixed, at a base end portion of the arm head 116, to a pivot shaft 118 rotatably provided to the vehicle 117 by a nut 119. The pivot shaft 118 is coupled via a link mechanism (not shown) to an unshown wiper motor equipped with the vehicle 117, and the wipe arm 115 is driven by the wiper motor and is swung within a predetermined angle range.

A retainer 121 is linked to a tip of the arm head 116 by a connecting shaft 120 so as to be rotatable in directions of approaching and separating from the window glass 112. An arm piece 122, which is formed of a plate-like stick material, is fixed to a tip of the retainer 121 by caulking, and the wiper arm 115 is attached to the wiper blade 114 at the tip of the arm piece 122. The retainer 121 is made of steel plate etc. and formed into an arm shape with a substantially C-like cross section, and an unshown spring for biasing the retainer 121 in the direction of approaching the window glass 112 is received in its interior using the connecting shaft 120 as a shaft center. By a biasing force of the spring, the wiper arm 115 applies a predetermined pressing force to the wiper blade 114.

Meanwhile, the wiper blade 114 has a stick shape extending in substantially parallel to a longitudinal direction of the wiper arm 115 and has, as shown in FIG. 12, a blade rubber 125, which abuts on a wiping face 112a formed in an outer face of the window glass 112, and a rubber holder 126 as a cover member that holds the blade rubber 125.

The rubber holder 126 has a primary lever 127, and a pair of secondary levers 128 coupled to both longitudinal-directional end portions of the primary lever 127. The primary lever 127 is formed longitudinally longer than the secondary lever 128, and the rubber holder 126 is attached, at a coupling portion 129 provided to its longitudinal-directional center portion, to a tip of the arm piece 122 in the wiper arm 115. As shown in FIG. 12, receiving spaces 126a, each of which opens on a wiping face 112a side of the window glass 112, are formed inside the rubber holder 126 (primary lever 127 and secondary levers 128). The blade rubber 125 is held by the primary lever 127 in a state where an end portion on its upper end side, i.e., on an opposite side to the window glass 112 is accommodated in the receiving space 126a.

The blade rubber 125 is made of a rubber material and formed into a stick shape having substantially the same dimension as a longitudinal-directional dimension of the rubber holder 126, and is held by the primary lever 127 to contact with the wiping face 112a of the window glass 112 and be bendable along the wiping face 112a. As shown in FIG. 12, the blade rubber 125 has: a lip portion 130 that contacts with the wiping face 112a at its lower end, i.e., at one end located on a window glass 112 side; a head portion 131 that is provided on an upper end side and covered with the rubber holder 126; and a neck portion 132 that connects the lip portion 130 and the head portion 131. The neck portion 132 is formed so that its thickness in a swinging direction (right and left directions shown in FIG. 12) is small with respect to the lip portion 130 and/or head portion 131, whereby the lip portion 130 is tiltable in the swinging direction with respect to the head portion 131.

Formed on both swinging-directional sides of the head portion 131 are mounting grooves 133 extending longitudinally, respectively. Mounted in each of the mounting grooves 133 is a leaf spring (vertebra) 34. The leaf spring 34 is formed into a flat-board shape having substantially the same dimension as the longitudinal-directional dimension of the blade rubber 125 by punching work of a plate material such as steel plate, thereby being elastically deformable in upper and lower directions, i.e., in a direction orthogonal to the window glass 112. By a spring force of the leaf spring 134, the blade rubber 125 is a state of nature, and causes its both longitudinal-directional end portions to be large bent toward the window glass 112 side. When the blade rubber 125 is placed on the window glass 112, and a predetermined pressing force is applied to its longitudinal-directional center portion from the wiper arm 115 via the rubber holder 126, the blade rubber 125 is bent so as to be deformed along a contour of the window glass 13. Therefore, the pressing force toward the wiping face 112a side is applied to the blade rubber 125 uniformly over the longitudinal-directional entirety, and the wiper blade 114 is swung in a state where the longitudinal-directional entirety contacts uniformly with the wiping face 112a, so that the wiper blade 114 can achieve a good wiping characteristic.

To improve an aerodynamic characteristic of the wiper blade 114 during the travel of the vehicle 111 to prevent the wiper blade 114 from floating up from the wiping face 112a, the rubber holder 126 is provided with a fin 137. The fin 137 is formed between the both longitudinal-directional end portions of the rubber holder 126 and the coupling portion 129 located at the longitudinal-directional center portion, i.e., along the longitudinal direction of the rubber holder 126 on the both longitudinal-directional sides between which the coupling portion 129 of the rubber holder 126 is sandwiched.

As shown in FIG. 12, the rubber holder 126 includes a front wall portion 138a in a swinging-directional-front side (vehicle-front side); a back wall portion 138b in a swinging-directional-back side (vehicle-back side); and a ceiling wall portion 138c connecting an upper end of the front wall portion 138a and an upper portion of the back wall portion 138b. Formed in its interior is a receiving space 126a, which communicates with the wiping face 112a side via an opening portion 138d. The fin 137 is provided integrally with the ceiling wall portion 138c on the swinging-directional-back side of the ceiling wall portion 138c so as to protrude above, i.e., toward an opposite side to the window glass 13. Namely, the ceiling wall portion 138a has an above-bent shape directed toward the swinging-directional-back side, on which the fin 137 is formed, from the swinging-directional-front side connected to the front wall portion 138a. Formed in an outer face of the ceiling wall portion 138c is a wind-receiving face 139, which is subjected to travel wind "W" (see FIG. 13) flowing from a front of the vehicle during the travel of the vehicle. Therefore, since the fin 137 (wind-receiving face 139) is subjected to the travel wind W during the travel of the vehicle, the pressing force in the direction of making the wiper blade 114 approach the window glass 112, i.e., a down force is generated, and the wiping characteristic of the wiper blade 114 can be enhanced.

As shown in FIG. 11, the wiper blade 114 is attached in substantially parallel with the wiper arm 115 so that its one longitudinal-directional side extends toward the base end side of the wiper arm 115. When the wiper arm 115 is driven for swing by the wiper motor using the pivot shaft 118 as a shaft center, the wiper blade 114 is swung along with the wiper arm 115 between an upper inversion position represented by bold lines in Figure and a lower inversion position represented by double-dot lines in Figure. Therefore, the blade rubber 125 of the wiper blade 114 is slit on the wiping face 112a of the window glass 112, and rainwater etc. adhering onto a wiping area "S" that is a locus of the blade rubber 125 in moving between the upper inversion position and the lower inversion position is wiped by the wiper blade 114. Namely, when the wiper blade 114 is swung to a swinging-directional front (arrow B direction) toward the lower inversion position from the upper inversion position, the rainwater etc. adhering onto the wiping area S is wiped by the blade rubber 125, and the rainwater etc. removed from the wiping area S is collected in a water-accumulated area "Sb". Similarly, when the wiper blade 114 is swung to a swinging-directional back (arrow C direction) toward the upper inversion position from the lower inversion position, the rainwater etc. adhering onto the wiping area S is wiped by the blade rubber 125, and the rainwater etc. removed from the wiping area S is collected in a water-accumulated area "Sc".

In the wiper device 13, to prevent water-conduction due to a back-face-side negative pressure generated on the swinging-directional-back side (on back-face side) of the wiper blade 114 during the travel of the vehicle, i.e., to prevent the rainwater collected in the water-accumulated area Sc from being drawn inside the wiping area S due to the back-face-side negative pressure in being swung from the upper inversion position to the lower inversion position (at an upper inversion time), a part of the travel wind W is aggressively guided on the back-face side of the wiper blade 114 by a through hole 142 formed in the rubber holder 126, whereby occurrence of the back-face-side negative pressure is suppressed.

Figure 13:
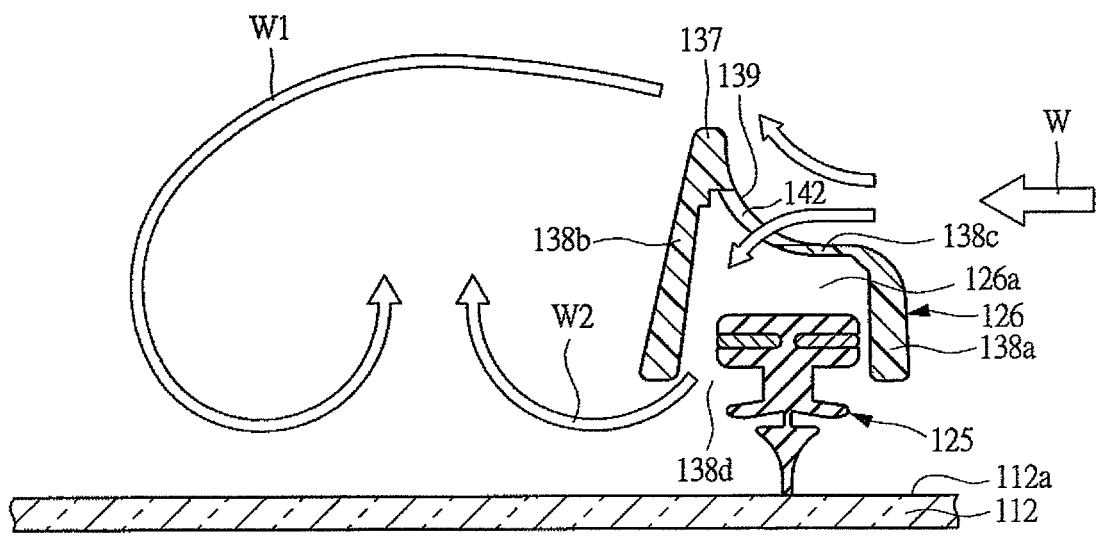
FIG. 13 is an explanatory diagram showing a flow of travel wind to which the wiper blade is subjected during the travel of the vehicle.
Figure 14:
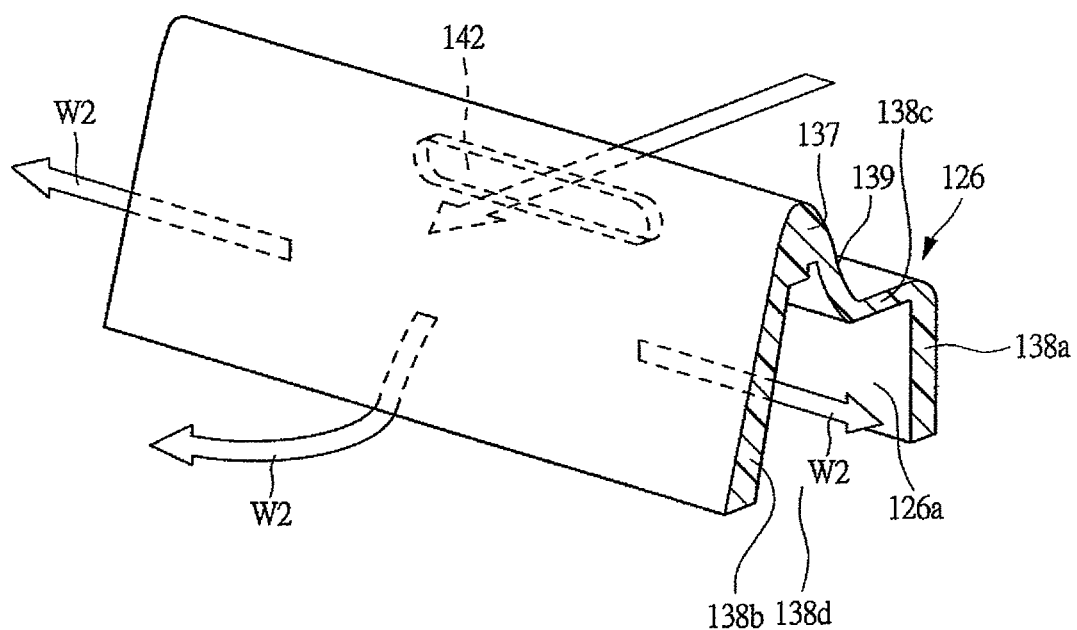
FIG. 14 is an explanatory diagram showing a flow of the travel wind flowing in the rubber holder.

FIG. 13 is an explanatory diagram showing a flow of travel wind to which the wiper blade is subjected during a travel of the vehicle, and FIG. 14 is an explanatory diagram showing an flow of travel window flowing in the rubber holder.

As shown in FIG. 10, in the present embodiment, the through hole 142 has a substantially rectangular shape extending in the longitudinal direction of the rubber holder 126. On each of both longitudinal-directional end sides between which the coupling portion 129 of the rubber holder 126 is sandwiched, four through holes 126 are formed so as to be spaced mutually at a predetermined interval in the longitudinal direction of the rubber holder 126. Namely, the two through hole 142 are formed on both longitudinal-directional sides between which the coupling portion 129 on the primary lever 127 is sandwiched, respectively, and the two through holes are informed in each of the secondary levers 128 forming a pair. Among the respective through holes 142, the four through holes 142a formed between the coupling portion 129 of the rubber holder 126 and the one longitudinal-directional end portion of the rubber holder 126 are hidden from the wiper arm 115 and are difficult to be viewed from outside, whereby an appearance of the wiper device 13 is prevented from deteriorating.

As shown in FIG. 12, each of the through holes 142 is formed in the ceiling wall portion 138c of the rubber holder 126. Each through hole 142 penetrates in the swinging direction (right and left directions in Figure) from the wind-receiving face 139 of the ceiling wall portion 138c toward the receiving space 126a inside the rubber holder 126, and the receiving space 126a is opened via each through hole 142 on a swinging-directional-front side, and is opened via the opening portion 138d on the wiping face 112a side of the window glass 112, i.e., on the swinging-directional-back side. For this reason, during the travel of the vehicle, as shown in FIG. 13, the travel wind W flows along the fin 137 (wind-receiving face 139) in an upper direction, i.e., in a direction of being separate from the window glass 112 side, and a part of the travel wind W flows inside rubber holder 126 via the through hole 142.

The travel wind W1 flowing above along the fin 137 is exfoliated at an upper end of the fin 137, and flows so that a back-face-side negative pressure (eddy) is generated on the back-face side (swinging-directional-back side) of the wiper blade 114. By an influence from this back-face-side negative pressure, the rainwater collected on the back-face side of the wiper blade 114 is drawn on the wiper blade 114 side, as a result of which a water-conducting phenomenon is generated. Meanwhile, the travel wind W2 flowing into the rubber holder 126 flows out from the back-face side of the wiper blade 114 via the opening portion 138d, and flows so as to offset the back-face-side negative pressure generated by the travel wind W1. Namely, since the through hole 142 provided in the rubber holder 126 guides aggressively a part of the travel wind W onto the back-face side of the wiper blade 114, generation of the back-face-side negative pressure by the travel wind W1 is suppressed.

Also, as shown in FIG. 14, the travel wind W2 flowing inside the rubber holder 126 flows out from the back-face side of the wiper blade 114, and flows inside the receiving space 126a of the rubber holder 126 longitudinally along an inner face of the back wall portion 138b. Therefore, also regarding a relationship between positions of forming the through holes 142 in addition to positions of forming the through holes 142, the travel wind W2 can be aggressively caused to flow out from the back-face side of the wiper blade 114.

Thus, since the through holes 142 are formed in the ceiling wall portion 138c of the rubber holder 126 to guide aggressively the part of the travel wind W (travel wind W2) onto the back-face side of the wiper blade 114 via the through holes 142 and the opening portion 138d, the generation of the back-face-side negative pressure due to the travel wind W1 flowing above along the fin 137 is suppressed by the travel wind W2 guided onto the back-face side of the wiper blade 114. Accordingly, for example, the rainwater collected in the water-accumulated area Sc at an upper inversion of the wiper blade 114 can be prevented from being drawn inside the wiping area S by the back-face-side negative pressure. Further, the travel wind W2 flowing in the rubber holder 126 flows out from the back-face side of the wiper blade 114 and, simultaneously, flows inside the receiving space 126a of the rubber holder 126 longitudinally along the inner face of the back wall portion 138b. Therefore, the travel wind W2 can be caused to flow out from the back-face side of the wiper blade 114 uniformly over the longitudinal-directional entirety of the blade rubber 14, and the generation of the back-face-side negative pressure can be certainly prevented over the longitudinal-directional entirety of the wiper blade 114.

As shown in FIG. 12, the back wall portion 138b of the rubber holder 126 is formed over its longitudinal-directional entirety so as to incline only an inclined angle "α" with respect to a direction orthogonal to the window glass 112 (upper and lower directions in Figure). Namely, the back wall portion 138b is aslope formed so as to be separate from the blade rubber 125 as being directed toward the wiping face 112a side of the window glass 112, and a gap "d1" between the back wall portion 138b around the opening portion 138d and the blade rubber 125 is set larger than a gap "d2" between the front wall portion 138a around the opening portion 138d and the blade rubber 125. For this reason, the travel wind W2 flowing in the rubber holder 126 is easily guided onto the back-face side of the blade rubber 14 via the gap d1. Further, the inclined angle α of the back wall portion 138b is set at such an angle as to be hidden from the back wall portion 138b and that the blade rubber 125 is difficult to be viewed from the interior of the vehicle. Accordingly, the appearance of the wiper device 13 can be prevented from deteriorating.

Figure 15:
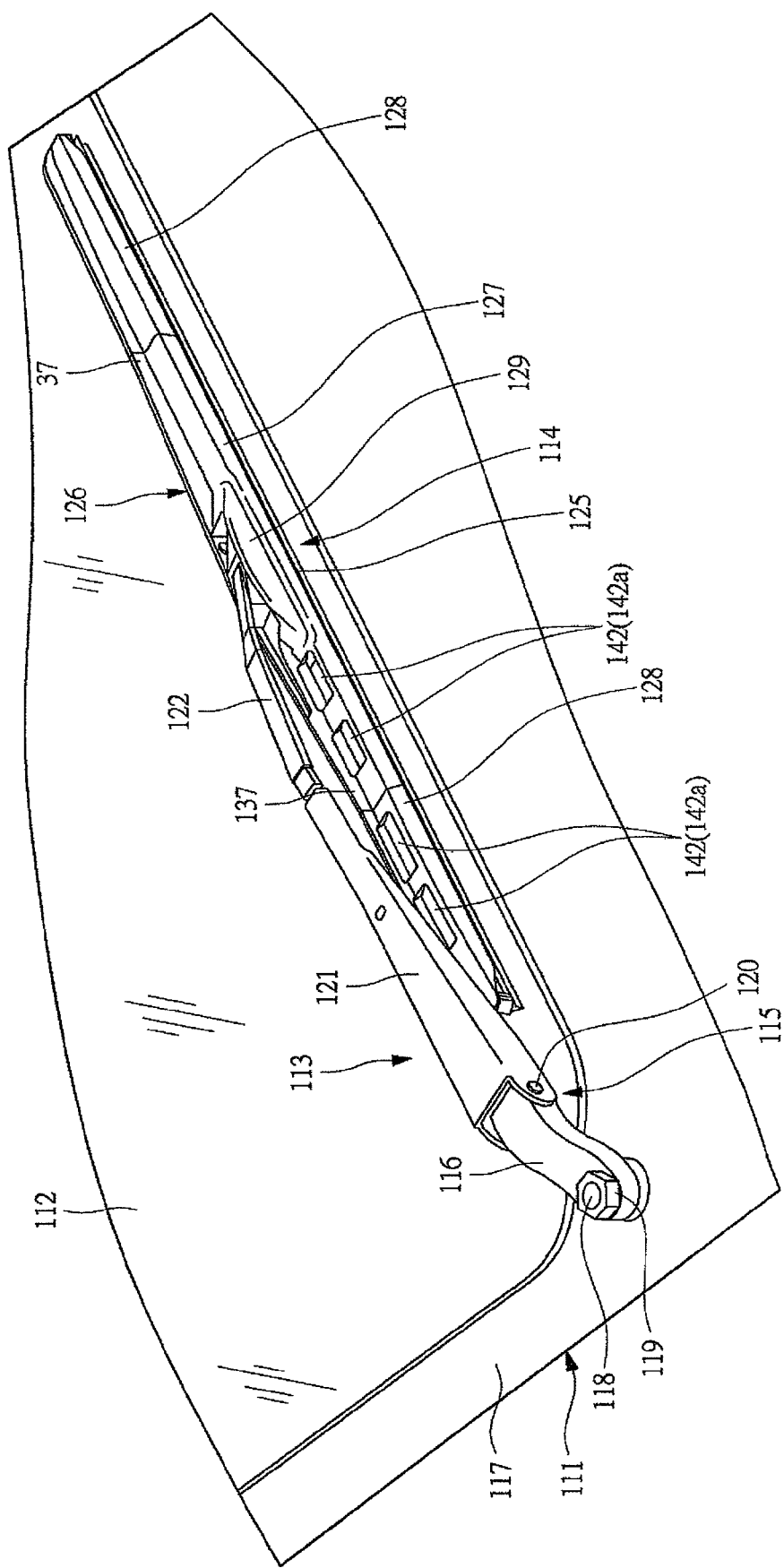
FIG. 15 is a perspective view showing a vehicle wiper device according to another embodiment of the present invention.

FIG. 15 is a perspective view showing a vehicle wiper device according to another embodiment of the present invention. In the another embodiment, the through holes 142 comprises only four through holes 142a, which are formed between the coupling portion 129 on the rubber holder 126 and the one longitudinal-directional end of the rubber holder 126. As described above, since the through holes 142a are hidden from the wiper arm 115 and are difficult to be viewed from outside the vehicle, the appearance of the wiper device 13 can be prevented from further deteriorating by forming only such through holes 142a in the rubber holder 126. Note that a significant factor of causing the water-conducting phenomenon is the back-face-side negative pressure (eddy) generated on the back-face side of the one longitudinal-directional end portion of the blade rubber 14, so that, like the another embodiment, also regarding a type in which the through holes 142 are not formed in the other longitudinal-directional end portion of the rubber holder 126, the generation of the water-conducting phenomenon can be sufficiently prevented.

Needless to say, the present invention is not limited to the above embodiment, and may be variously modified within a scope of not departing from the gist. For example, in the above embodiment, the four through holes 142 are formed on each of the both longitudinal-directional sides between which the coupling portion 129 of the rubber holder 126 is sandwiched, or the four through holes 142 are formed on the one longitudinal-directional side of the rubber holder 126 (between the coupling portion 129 and the one longitudinal-directional end). However, the number of and/or each shape of through holes 142 is not limited to these, and at least one through hole 142 may be formed on the one longitudinal-directional end side of the rubber holder 126.

Also, in the above embodiment, the back wall portion 138b of the rubber holder 126 is formed aslope over its longitudinal-directional entirety, but the back wall portion 138b may be aslope formed at least on the one longitudinal-directional end side of the rubber holder 126.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper blade attached to a tip of a wiper arm to wipe a window glass of a vehicle, the wiper blade comprising:
    a rubber holder attached to the wiper arm at a longitudinal-directional center portion; and
    a blade rubber having a longitudinal-directional intermediate portion covered with the rubber holder, and contacting with the window glass,
    wherein the rubber holder has a top wall, a front wall integrally formed with a vehicle-front side end of the top wall and extending toward the window glass, a back wall integrally formed with a vehicle-back side end of the top wall and extending toward the window glass, a holding claw extending from an inner face of each longitudinal-directional end of the front wall and engaging with the blade rubber, and a holding claw extending from an inner face of each longitudinal-directional end of the back wall and engaging with the blade rubber, and
    an interval between an inner face of the back wall and the blade rubber becomes gradually expanded with respect to an interval between an inner face of the front wall and the blade rubber as being directed toward the center portion from the both longitudinal-directional end portions of the rubber holder.

2. The wiper blade according to claim 1,
    wherein an interval between a lower end of the back wall and the window glass becomes gradually large with respect to an interval between a lower end of the front wall and the window glass as being directed toward the center portion from the both longitudinal-directional end portions of the rubber holder.

3. A wiper blade attached to a tip of a wiper arm to wipe a window glass of a vehicle, the wiper blade comprising:
    a rubber holder having holding claws on both longitudinal-direction end portions, and attached to the wiper arm at a longitudinal-directional center portion;
    a blade rubber engaged with the holding claws and held by the rubber holder, a longitudinal-directional intermediate portion of the blade rubber being covered with the rubber holder, and contacting with the window glass; and
    a pair of covers coupled respectively to the both longitudinal-directional end portions of the rubber holder, and covering a portion on a tip side of the blade rubber protruding from the rubber holder,
    wherein the rubber holder has a top wall, a front wall integrally formed with a vehicle-front side end of the top wall and extending toward the window glass, a back wall integrally formed with a vehicle-back side end of the top wall and extending toward the window glass, a holding claw extending from an inner face of each longitudinal-directional end of the front wall and engaging with the blade rubber, and a holding claw extending from an inner face of each longitudinal-directional end of the back wall and engaging with the blade rubber,
    an interval between an inner face of the back wall and the blade rubber becomes gradually expanded with respect an interval between an inner face of the front wall of the rubber holder and the blade rubber as being directed toward a center portion from both longitudinal-directional end portions of the rubber holder,
    wherein each of the covers has a top wall, a front wall integrally formed with a vehicle-front side end of the top wall and extending toward the window glass, a back wall integrally formed with a vehicle-back side end of the top wall and extending toward the window glass, a holding claw extending from an inner face of each longitudinal-directional end of the front wall and engaging with the blade rubber, and a holding claw extending from an inner face of each longitudinal-directional end of the back wall and engaging with the blade rubber, and
    an interval between an inner face of the back wall of each of the covers and the blade rubber becomes gradually expanded with respect to an interval between an inner face of the front wall of each of the covers and the blade rubber as being directed toward a center portion thereof from both longitudinal-directional end portions thereof.

4. The wiper blade according to claim 3,
    wherein an interval between a lower end of the back wall and the window glass becomes gradually large with respect to an interval between a lower end of the front wall and the window glass as being directed toward the center portion from the both longitudinal-directional end portions of the rubber holder or covers.

* * * * *